Sept. 17, 1968 J. S. DE METRICK 3,401,944

TAPE CARTRIDGE INSERT

Filed Feb. 17, 1967 2 Sheets-Sheet 1

INVENTOR
JOHN S. DEMETRICK
BY
Wolf, Greenfield & Hieken
ATTORNEYS

TAPE CARTRIDGE INSERT

Filed Feb. 17, 1967 2 Sheets-Sheet 2

INVENTOR
JOHN S. DEMETRICK
BY
Wolf, Greenfield & Hieken
ATTORNEYS

United States Patent Office 3,401,944

Patented Sept. 17, 1968

3,401,944

TAPE CARTRIDGE INSERT

John S. De Metrick, Lexington, Mass., assignor to Automatic Radio Manufacturing Co., Inc., Melrose, Mass., a corporation of Massachusetts Filed Feb. 17, 1967, Ser. No. 616,962
6 Claims. (Cl. 274—4)

ABSTRACT OF THE DISCLOSURE

In insertable pressure roller for insertion into the opening of a conventional 2-track or 4-track endless tape cartridge is arranged with a locking catch that mates with an opening in a conventional 8-track tape player chassis plate. With the adapter in the cartridge and the locking catch in the mating opening of the 8-track tape player chassis plate, the pressure rollers urges the tape against the tape player capstan while the adapted further includes an element for releasing the cartridge brake relief spring so that the capstan may drive the tape, thereby permitting the 2-track or 4-track cartridge to be played on the 8-track player.

*Background of the invention*

The present invention relates in general to tape cartridge inserts especially useful as an adapter for a tape cartridge and more particularly concerns a novel adapter suitable for insertion into a 2-track or 4-track cartridge so that conventional commercially available 2-track or 4-track cartridges may be played in an 8-track commercially available stereo tape player, such as an Automatic Radio Type tape player, requiring but a minor modification.

The invention is relatively easy to insert and remove by an unskilled person while insuring excellent reproduction with the adapter inserted in the cartridge and the cartridge inserted in the tape player.

Conventional 2-track and 4-track endless tape cartridges typically include an opening in the bottom for accommodating a pressure roller associated with the tape player that urges the tape against the tape player capstan as the cartridge is inserted. Such a tape player is exemplified by the commercially available Automatic Radio Type CSE 6381C tape player. However, 8-track tape cartridges, now in wide commercial use, each include a self-contained pressure roller, resulting in 8-track tape players that are less expensive and less complex and operate with higher reliability because the mechanism for moving the pressure roller up and down is eliminated. A disadvantage of this arrangement is the added cost associated with having a pressure roller in each 8-track cartridge.

Accordingly, it is an important object of this invention to provide an adapter that enables a 2-track or 4-track standard cartridge to be played in an 8-track tape player.

It is another object of the invention to achieve the preceding object with an adapter that is easy to insert and remove by an unskilled person.

It is still a further object of the invention to achieve the preceding objects with an adapter that is relatively easy and inexpensive to fabricate and operates reliably for relatively long periods of time.

It is still a further object of the invention to achieve the preceding objects with but a minor modification to an existing 8-track player.

It is still a further object of the invention to provide an insertable pressure roller for use in a tape cartridge to thereby reduce the cost of the individual tape cartridges.

*Summary of the invention*

According to the invention there is an insertable pressure roller mounted on mating means including a plate arranged to snugly fit within the cartridge opening through which the pressure roller of a conventional 2-track or 4-track player normally passes so that when the cartridge with the insertable roller is placed in an 8-track machine, the pressure roller urges the cartridge tape against the tape player capstan. Preferably the invention includes interlocking means between the tape player and the insertable means for insuring that when the cartridge and insertable element are inserted fully into the 8-track player, the pressure roller urges the tape against the capstan.

In a specific form of the invention, the mating plate is circular to fit within the generally circular opening in the bottom of a cartridge to be adapted. This mating plate preferably sits on a lower base portion having a width greater than the circle diameter and sides generally parallel to the lengthwise edge of the cartridge in which it is situated so that when the adapter is in position, one of these sides is substantially flush with the side of the tape cartridge. Preferably the circular mating plate and lower base are formed with an opening through which opening a lock catch passes for engagement with an opening formed in the tape player deck for locking the adapter in a position with the pressure roller urging the cartridge tape against the tape player capstan.

Numerous other features, objects and advantages of the invention will become apparent from the following specification when read in connection with the accompanying drawing in which:

*Detailed description of the preferred embodiment*

Figure 1:
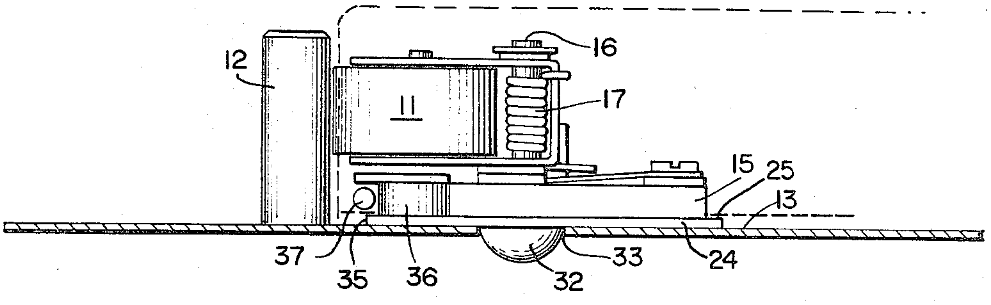
FIG. 1 is a side view illustrating a cartridge having the adapter in place locked in position for playing in an 8-track player with the pressure roller urging the tape against the tape player capstan.
Figure 4:
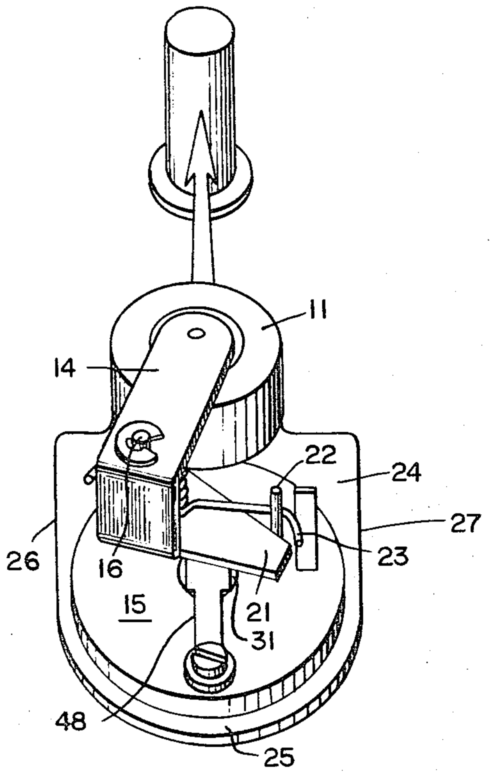
FIG. 4 is a perspective view of the adapter assembly itself relative to the tape player capstan in the unloaded position.

With reference now to the drawing and more particularly FIG. 1 thereof, there is shown a side view of the adapter illustrating the relationship among the pressure roller 11, the tape player chassis plate 13 and the capstan 12 with the adapted cartridge in playing position. With additional reference to the perspective view of FIGS. 4 and 5, the adapter comprises a pressure roller 11 supported in a pressure roller pivot cradle 14 mounted on the circular mating plate 15 for pivotal movement about a vertical pivot pin 16. A pressure roller spring 17 urges the pressure roller pivot cradle 14 counterclockwise about pivot pin 16. In the unloaded position shown in FIG. 4 the bottom leaf 21 of pressure roller pivot cradle 14 limits this counterclockwise movement when it engages the same stud 22 that stops the spring end 23.

Circular mating plate 15 is upon a lower base plate 24 generally of the form shown having a semicircular back edge 25 of diameter greater than that of circular mating plate 15 and corresponding to the width of the plate 24; that is, the separation between the generally parallel sides 26 and 27. Sides 26 and 27 are generally parallel to the sides 28 and 29 of the cartridge, as best seen in FIG. 2, with side 26 being preferably flush with the edge of side 29 as shown.

Figure 5:
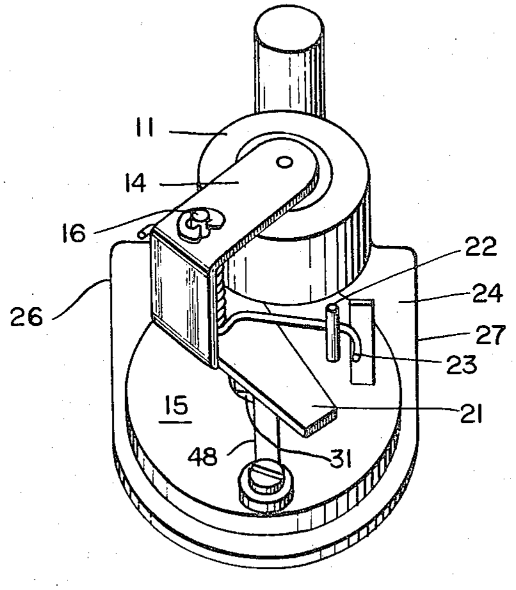
FIG. 5 is a perspective view of the elements of FIG. 4 with the adapter in the loaded position.

Circular mating plate 15 and base plate 24 may be formed as a unitary structure, typically being made of suitable plastic and/or formed with an opening 31 through which adapter locking catch 32 protrudes to fit within a mating opening 33 in the tape player chassis plate when the cartridge is in the loaded position shown in FIG. 1 and in FIG. 5.

The locking catch is preferably a spring-loaded ball as shown loaded by spring 48 so that insertion and withdrawal of the cartridge with the adapter in place is easy to accomplish. It could, of course, take numerous other forms, such as a resilient U-shaped wire.

Figure 2:
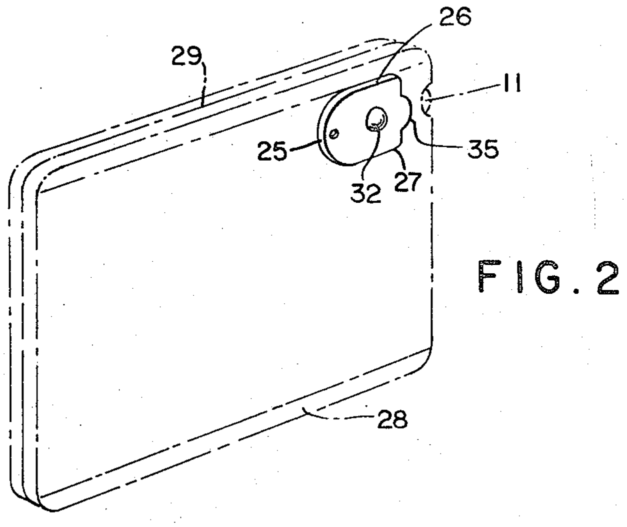
FIG. 2 is a bottom view of the adapter loaded in a cartridge.

The base plate 24 is preferably formed with an acruate front edge 35, best seen in FIG. 2, which supports a cartridge brake release engaging portion 36 that engages the cartridge brake release element 37 to allow the tape to move freely when driven by the capstan. The tape cartridge includes a brake that is normally engaged to keep the reel of tape stationary except when being played. The brake release element 37 is typically a resilient wire that is arranged to be engaged by the pressure roller of a conventional four-track tape player when the tape player pressure roller is extended through the cartridge opening as the cartridge is inserted to press the tape against the tape player capstan and move the brake release element 37 in the same direction to release the cartridge brake. As the insert of the present invention is inserted up and through the opening in the cartridge, the portion 36 engages the brake release element 37.

Figure 3:
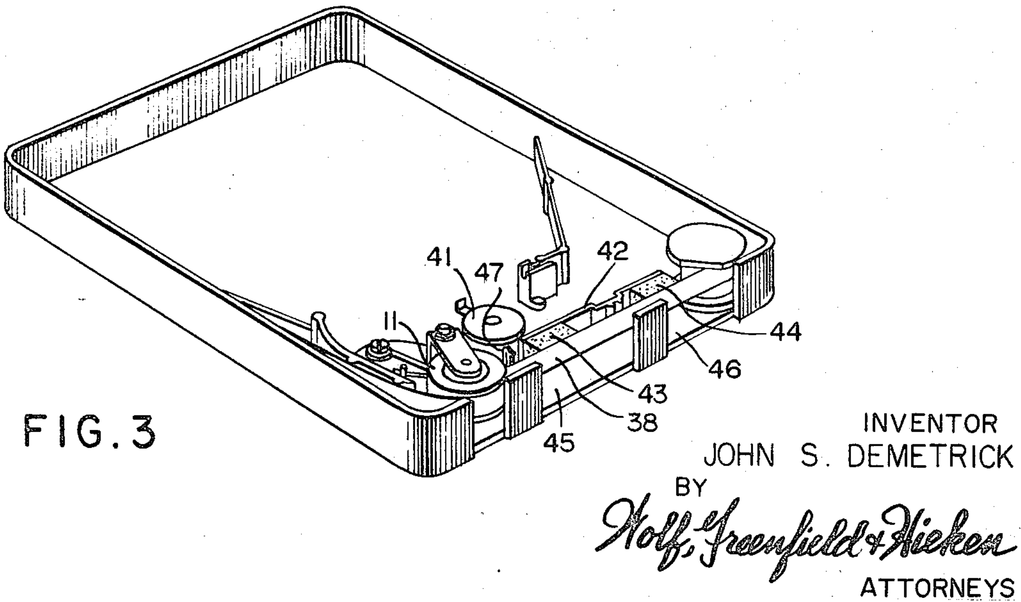
FIG. 3 is a top view of the adapter loaded in a cartridge with the cartridge top removed.

FIG. 3 is a top view of a cartridge with the top removed showing the adapter in place and illustrating how the endless tape 38 rides over the pressure roller 11.

To illustrate the relation of the invention to a conventional 4-track cartridge, certain of the cartridge elements are shown that are not a part of the invention. These include the cartridge brake retaining washer 41, the pressure pad arm 42 carrying foam pressure pads 43 and 44 for urging the tape 38 against the head and sensing contacts that may penetrate through openings 45 and 46, respectively, and the rib 47 for strength and support of the tape wire guide.

Operation of the invention is easily performed by an unskilled person. The adapter is grasped by the base plate 24 and inserted into the opening in the cartridge to the position shown in FIG. 2. The cartridge with the adapter is then inserted into the tape player until the adapter locking catch 32 engages the mating opening 33 in the tape player chassis plate 13. After the cartridge is played, it may be removed in the usual manner. The adapter may then be easily removed from the cartridge by grasping the base plate 24.

While the adapter is especially useful in connection with adapting existing 2-track and 4-track cartridges for use in an 8-track player, the invention may also be used for 8-track or other cartridges that do not have an internal pressure roller. Thus, 8-track cartridges now made with internal pressure rollers may be made at lower cost without an internal pessure roller.

The specific embodiment descibed herein is by way of example only for illustrating the best mode now contemplated for practicing the invention. It is evident that those skilled in the art may now make numerous uses and modifications of and departures from the specific embodiment described herein without departing from the inventive concepts. Consequently, the invention is to be construed as embracing each and every novel feature and novel combination of features present in or possessed by the apparatus and techniques herein disclosed and limited solely by the spirit and scope of the appended claims.

The embodiments of the invention in which an exclusive property or privilege is claimed, are defined as follows:

1. An insert, for a record tape cartridge having a cartridge opening for receiving a pressure roller, comprising;

mating means for snugly fitting said insert within said cartridge opening, pressure roller means, supported by said mating means, for urgnig tape in said cartridge against the capstan of a tape player when said cartridge is inserted in said tape player wtih said insert positioned in said cartridge with said mating means snugly fitting within said cartridge opening, and locking means carried by said mating means for locking engagement with means in said tape player coacting with said locking means for releasably securing said tape cartridge in said tape player when said pressure roller is urging said tape against said capstan and said insert is positioned in said tape cartridge with said mating means snugly fitting within said cartridge opening.

2. An insert in accordance with claim 1 wherein said mating means includes a circular mating plate.

3. An insert in accordance with claim 1 wherein said locking means comprises a spring-loaded ball.

4. An insert in accordance with claim 1 in combination with said record tape cartridge and said tape player, with said tape player being formed with said means coacting with said locking means for mating engagement therewith to position said tape cartridge with said pressure roller means urging said tape against said capstan.

5. A tape player for use with the insert of claim 1, said tape player including said means in said tape player coacting with said locking means.

6. A tape player in accordance with claim 5 wherein said means in said tape player for coacting with said locking means comprises a tape player chassis plate formed with an opening positioned a distance from the tape player capstan less than the distance between said locking means and a point on said pressure roller means farthest from said locking means when fully extended so that when said cartridge is inserted in said tape player with said insert positioned in said cartrdige with said mating means snugly fitting within said cartridge opening and said tape is urged against said capstan, said locking means resides within said opening in said chassis plate, aid opening being dimensioned for snugly accommodating said locking means.

References Cited

UNITED STATES PATENTS

| | | |
|---|---|---|
| 3,289,763 | 12/1966 | Taylor et al. |
| 3,243,134 | 3/1966 | Reed et al. |
| 3,217,997 | 11/1965 | Lundgren et al. |
| 3,210,482 | 10/1965 | Fischer. |
| 2,778,880 | 1/1957 | Eash. |
| 2,135,026 | 11/1938 | Becker. |

LEONARD FORMAN, *Primary Examiner.*

ROGER A. FIELDS, *Assistant Examiner.*